Jan. 13, 1925.  1,522,976
F. PILGER
AIRCRAFT
Filed Dec. 14, 1922   5 Sheets-Sheet 3
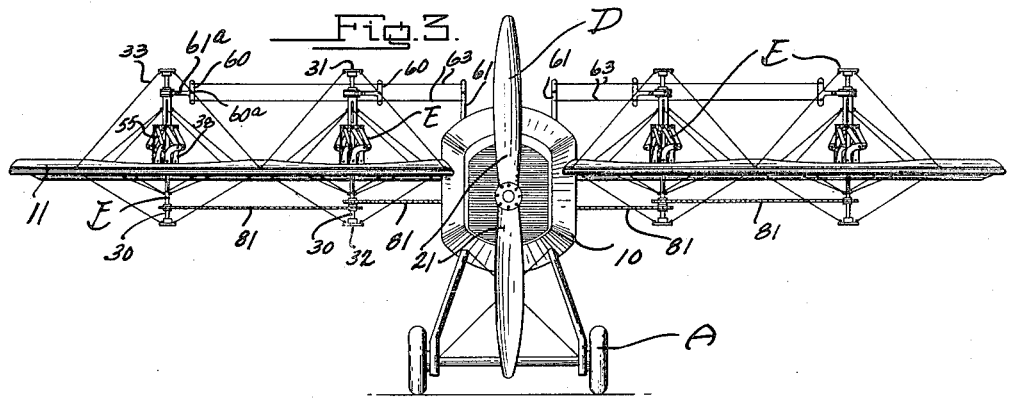
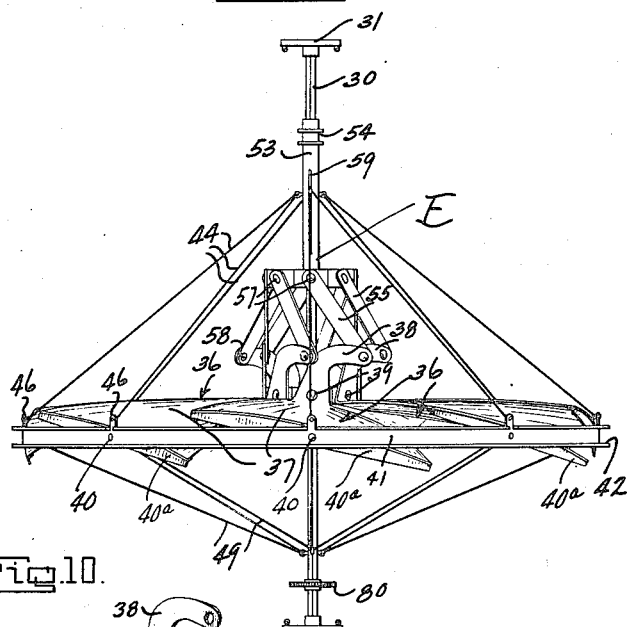
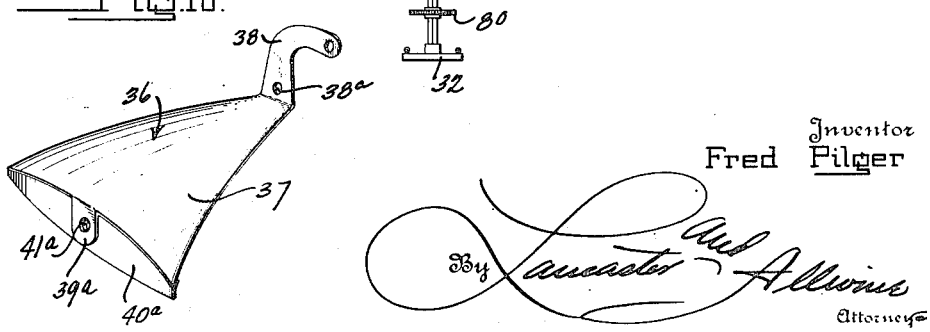
Inventor
Fred Pilger
By Lancaster Allwine
Attorneys

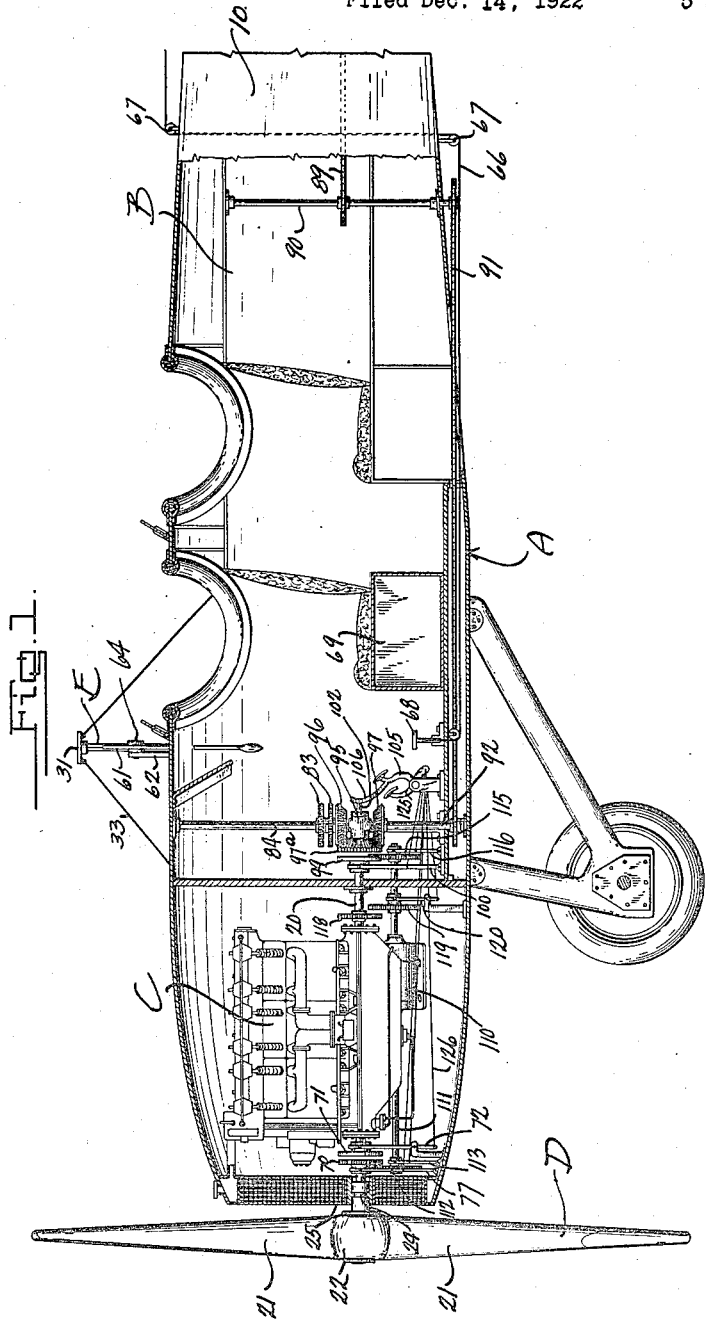

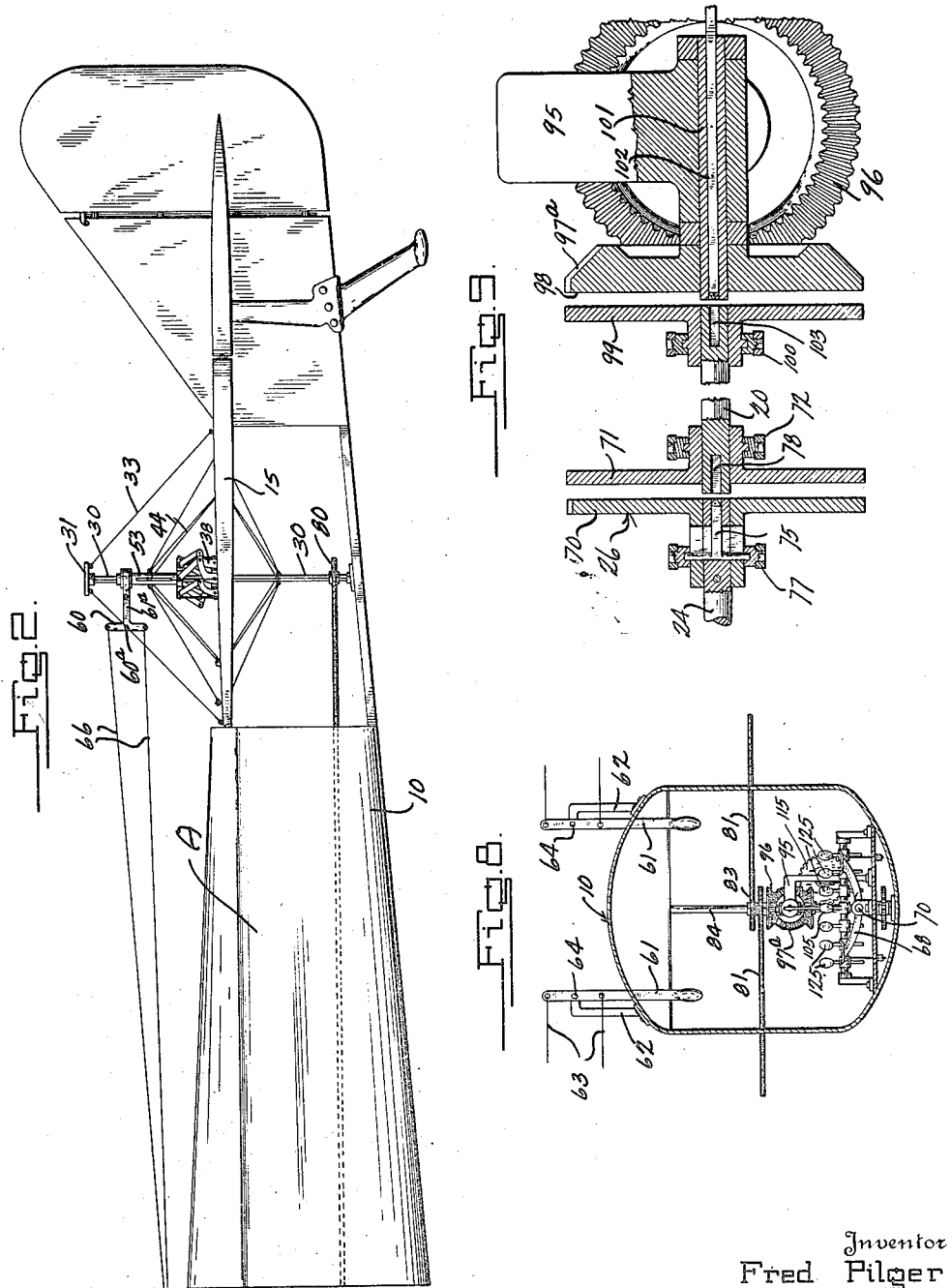

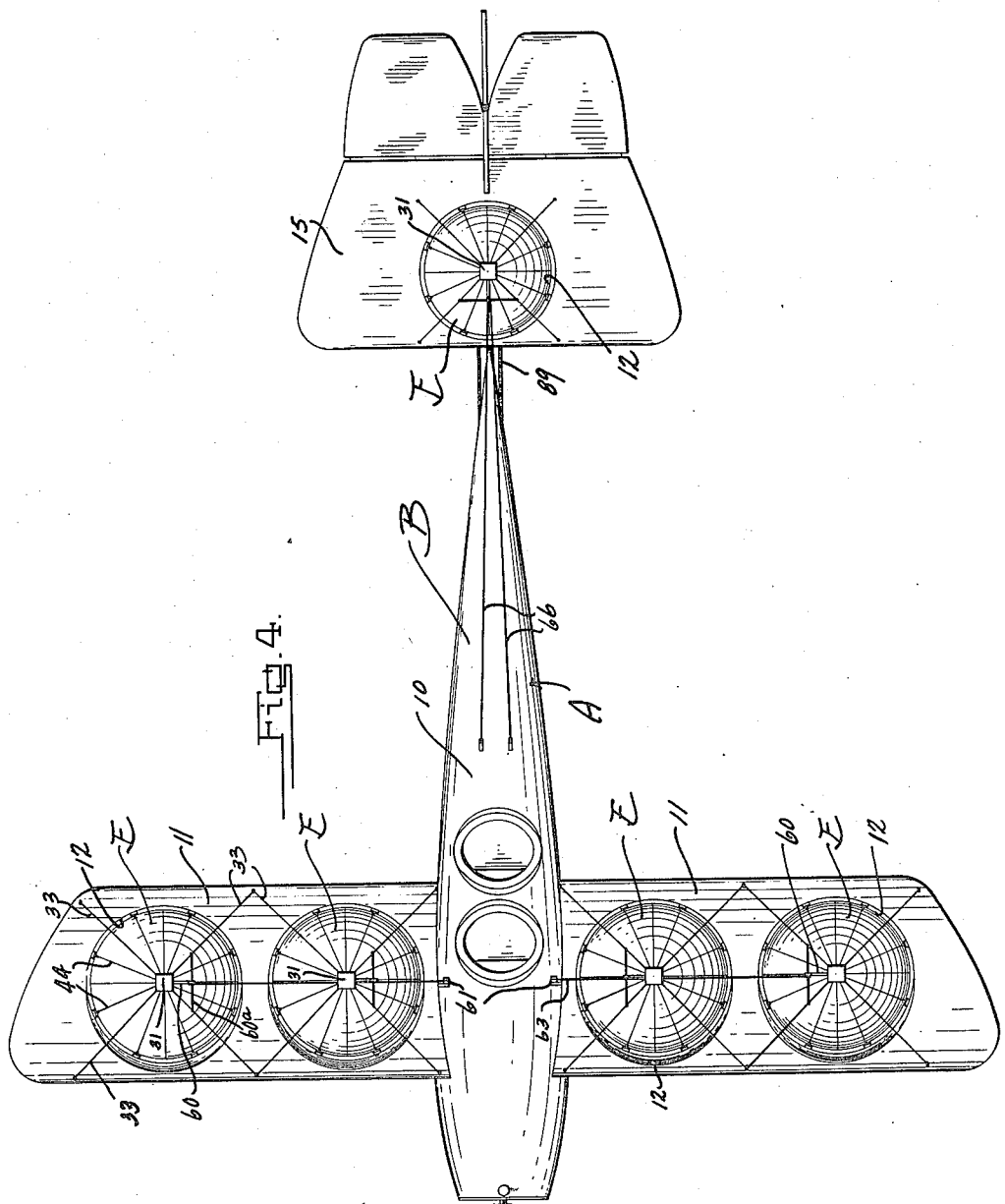

Jan. 13, 1925.  1,522,976
F. PILGER
AIRCRAFT
Filed Dec. 14, 1922   5 Sheets-Sheet 5

Inventor
Fred Pilger
By Lancaster and Allwine
Attorneys

Patented Jan. 13, 1925.

1,522,976

UNITED STATES PATENT OFFICE

FRED PILGER, OF AUDUBON, FLORIDA.

AIRCRAFT.

Application filed December 14, 1922. Serial No. 606,866.

*To all whom it may concern:*

Be it known that I, FRED PILGER, a citizen of the United States, residing at Audubon, in the county of Brevard and State of Florida, have invented certain new and useful Improvements in Aircraft, of which the following is a specification.

This invention relates to improvements in aircraft.

The primary object of this invention is the provision of means to facilitate the substantially vertical ascent and descent of aircraft.

An important object of this invention is the provision of an improved lifting and propelling arrangement for aircraft, embodying means for selectively utilizing propellers to facilitate vertical or horizontal motions.

A further and important object of this invention is the provision of a novel type of propeller adapted for association with a sustaining surface or plane, whereby the same may be selectively utilized as a propeller for imparting motion in a desired direction to the aircraft, or used as part of the sustaining plane or surface.

A further object of this invention is the provision of an aircraft, embodying vertical lift and horizontal directing propellers for association in a compact arrangement with a prime mover, whereby they may be selectively used.

Other objects and advantages of this invention will be apparent during the course of the following detailed description.

In the accompanying drawings, forming a part of this specification, and wherein similar reference characters designate corresponding parts throughout the several views:

Figure 1 is a fragmentary longitudinal cross sectional view, taken through an aeroplane, showing certain essential details of this invention.

Figure 2 is a fragmentary side elevation of the wheel portion of an aeroplane, showing the manner in which the improved helicopter type of propeller is utilized and operated in connection with a tail supporting surface or plane.

Figure 3 is a front elevation of the improved aircraft, showing the novel propeller arrangement as utilized in connection therewith.

Figure 4 is a plan view of the improved aircraft and its novel propelling arrangement.

Figure 7 is a side elevation altogether similar to that illustrated in Figure 6, however, showing the blades of the propeller in open position, as distinguished from the position of the blades illustrated in Figure 6.

Figure 8 is a transverse cross sectional view, taken through the fuselage of the improved aircraft and showing essential details of this invention as cooperating therein.

Figure 9 is a fragmentary cross sectional view, taken through certain operating mechanism of the improved propeller arrangement embodied in this invention, showing the driving connections as used with the drive shaft of a prime mover.

Figure 10 is a perspective view of an improved propeller blade, showing the construction and camber of the same.

Figure 5:
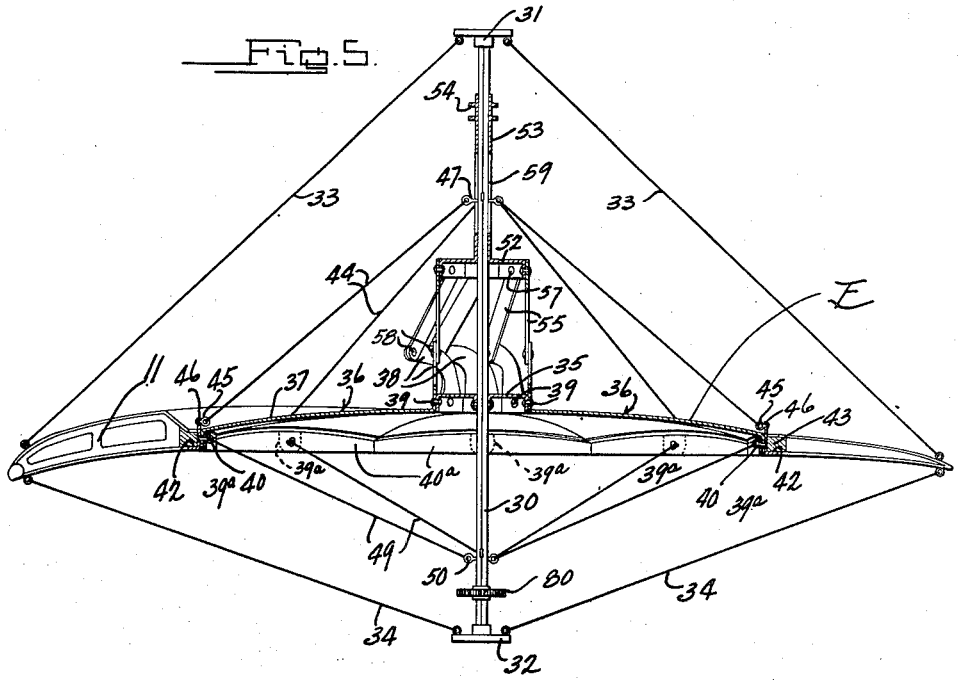
Figure 5 is a transverse cross sectional view, taken through an aircraft sustaining plane and the novel propeller as embodied therein.
Figure 6:
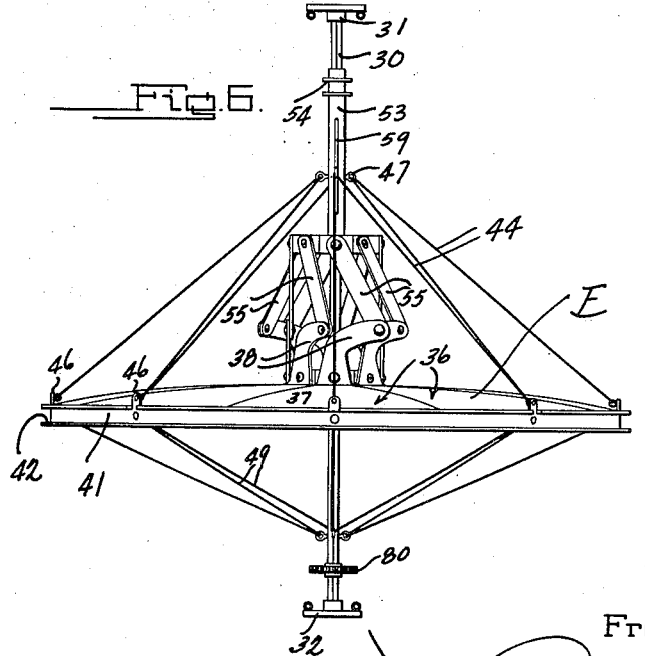
Figure 6 is a side elevation of the improved propeller, showing the various associated details thereof.

In the drawings, wherein for the purpose of illustration is shown but the preferred embodiment of this invention, the letter A generally designates an aircraft, which may include the body construction B, and having an internal combustion engine C associated therein, for operation of a forward travel propeller D, and vertical travel propellers E.

Referring to the body construction B, the same preferably includes the fuselage 10, which may support the laterally extending sustaining planes 11 in any approved manner. The application of the improved propellers E contemplates the provision of openings 12 in the planes 11. The aircraft A may be of the monoplane, biplane, or any type, and in addition to the forward sustaining planes 11, the rear stabilizing plane 15 may be provided, having an opening 12 therein, altogether similar to the openings 12 provided in the planes 11.

The internal combustion engine C may be of any approved type, and preferably includes the drive shaft 20 arranged longitudinally within the fuselage 10.

The forward travel propeller D may be of the ordinary type, including blades 21, and a hub portion 22 mounted on a stub shaft 24, which may bear in the arrangement 25; and having a clutch drive connection 26 for association with the drive shaft 20 of the engine C, and which will be subsequently described.

Referring to the type of propeller E, which facilitates the vertical ascent of the aircraft A, a plurality of the same are provided in connection with the aircraft A, and one of which will be described in detail. This propeller E is of that type adapted for rotation in a substantially horizontal plane, and includes a polygonal shaped shaft 30, rotatably supported at its ends by bearings 31 and 32; said bearings being upwardly and downwardly connected with respect to a sustaining plane 11 or 15, as by means of the respective guy or stay wires 33 or 34. A collar 35 is rigidly affixed circumferentially of the shaft 30 and intermediate the ends thereof for pivotally or oscillatively receiving the inner ends of the propeller blades 36.

The propeller blades 36 are of identical construction, and each of the same preferably includes a body or blade portion 37, which is concavo-convex both transversely and longitudinally in order to conform to the camber or contour of its sustaining plane, cooperating therewith in lessening head on resistance, and facilitating its use as a sustaining element in connection with the sustaining plane. The inner end of each of the blades 36 is preferably provided with an L-shaped lever arm 38 rigid therewith, and preferably pivotally connected as by a pin 39, to the collar 35 at the juncture of the lever arm with the body 37. The forward or larger end of each of the blades 36 is preferably downturned, as at 39ª, for pivotal connection, as by a pin 40, to an annular collar or supporting band 41. A stiffener strip 40ª is preferably provided at the outer edge of each propeller blade 36, which is of inherent rigidity, and primarily provided for lateral reinforcing of the body 37 thereof. This strip 40ª may be welded or otherwise secured at the outer-marginal edge portion of the body 37 of the blade 36, and provided with an opening therein which aligns with an opening in the depending portion 39ª, to provide a passage way 41ª for reception of a pin 40, as above mentioned. The annular supporting member 41 is preferably channel shaped in cross section; the annular groove 42 of which may receive the reduced annular flange 43 provided by the sustaining surface of plane of the aircraft 10, about the opening 12 therein. The annular supporting member 41 is supported above the sustaining plane 11, as by guy or stay wires 44, which may be connected to pins 45 carried by upstruck portions 46 of the supporting member 41; the upper ends of the guy wires 44 preferably being rigidly affixed to the shaft 30, as by pins or staples 47. Similar guy or stay wires 49 are provided below the plane 11, being connected to the pins 40 above mentioned, at their inner ends, and at their lower ends said guy wires being connected to the shaft 30, as by pins 50, substantially as is illustrated in Figure 5 of the drawings. In this manner, the annular bearing member 41 pivotally supports the outer end of each of the propeller blades 36, and is concentrically maintained in position with respect to the shaft 30.

Operating means for oscillation of the propeller blades 36 is provided, which includes a disc member 52 slidably supported, as by a sleeve 53, upon the shaft 30 upwardly of the sustaining surface or wing 11, the upper end of the sleeve 53 being provided with flanges forming an annular groove 54. The flange or collar 52 is connected for operation of each propeller blade 36, as by means of links 55, one of each being provided for the offset L-shaped arm 38 of a propeller blade; the upper ends of the links 55 being pivotally connected to the disc member 52, as by pins 57, and the lower ends thereof being pivoted to the outer free ends of the L-shaped arms 38, as by pins 58. It is thus obvious that upon longitudinal sliding of the sleeve 53 and its disc 52 upon the shaft 30, the arms 38 will be rocked so as to oscillate the blades 36 on their pivot pins 39 and 40, whereby they may be relatively adjusted as to the pitch thereof. Certain slots 59 may be provided longitudinally in the sleeve 53 for accommodation of the pins 47 above mentioned.

In connection with the vertical adjustment of the sleeve 53 upon the drive shaft 30 of each propeller E, a T-shaped operating member 60 is provided, which is preferably pivoted, as at 60ª, to a guy or stay wire 33, so that an end 61ª thereof extends forwardly for movable connection in the annular groove 54, in the well known manner, to permit shifting of the sleeve 53 upon rocking of the member 60. Operating levers 61 may be pivotally mounted by standards 62, which are connected to the upper part of the fuselage 10, substantially as is illustrated in Figures 1 and 8 of the drawings. Operating wires 63 may extend upwardly and below the pivot points 64 of these levers 61, which lead to the members 60 for connection thereto, in order that upon movement of the lever 61 in one direction, all of the operating sleeves 53 will be slid in one direction along the shafts 30, and by movement of said levers 61 in an opposite direction, the sleeve 53 may likewise travel in opposite directions. One of these levers 61 may be employed in connection with each of the lateral sustaining planes 11.

In connection with the operation of the propeller E which is mounted in the rear supporting or sustaining surface 15 of the aircraft A, operating wires 66 may be provided, for connection to the T-shaped operating lever 60 of said propeller E; said wires 66 leading forwardly along the fuselage 10, and being downwardly led, as by means of pulleys 67, to extend along the floor of the fuselage 10 for connection to the rocker pedal 68 mounted adjacent the driver's seat 69. This pedal 68 is pivotally or oscillatively mounted, as at 70, and the wires or operating cables 66 are connected to the pedal 68 upon opposite sides of the pivot point 70, so as to secure complete controlling adjustment of the blades of the propeller E mounted in the rear stabilizing or sustaining plane 15.

Referring to the operating means 26, a friction disc 70 is preferably provided, rigid with the propeller shaft 24, which is disposed in facing cooperating relation with a friction disc 71, splined in any approved manner for longitudinal sliding upon the drive shaft 20. An operating lever 72 may be pivotally mounted in the fuselage 10 for longitudinal movement of the disc 71 for frictional clutching engagement with the disc 70 to effect a drive for the propeller D. As will be subsequently described, it will be necessary to effect connections of the propellers D and E when the engine shaft 20 is rotating at high speed, and hence the friction discs 70 and 71 play an important part in gradually clutching of the propeller D to the drive shaft 20 until the same has an increased momentum equal to the shaft 20. It is obvious that any positive rigid clutching engagement would be detrimental, were the same to connect the propeller D for rotation to the engine drive shaft 20 during high speed rotation of the latter. However, it is desirable to have a positive connection, in order that the shaft 24 of the propeller D may rotate at the same speed as the drive shaft 20. To effect such connection, a polygonal shaped pin 75 is slidably positioned within the propeller shaft 24, being operable as by means of a lever 77 for longitudinal sliding to be disposed within a socket 78 in the end of the drive shaft 20, and substantially as is illustrated in Figure 9 of the drawings.

Referring to the means for operation of the various vertical lift propellers E, it is preferred to provide a gear or gears 80 at the lower end of each of the propeller shafts 30. In the case of the shaft 30 mounted for rotational movement in the forward sustaining or supporting planes 11, it is preferred to provide a series of link chains 81, which may extend to the various shafts 30, and operably engage certain gears 83 mounted upon the vertical shaft 84 within the forward chamber of the fuselage 10. For operation of the rear lift propeller E, in the plane 15, the gear 80 carried thereby may cooperate with the chain 89, vertical shaft 90 and chain 91, the latter of which is connected for rotation to a vertical operating shaft 92 mounted in alignment with the shaft 84; the proximate ends of the shafts 84 and 92 preferably bearing within a support 95 of any approved construction. Bevelled gears 96 and 97 are respectively carried by the shafts 84 and 92, and in meshing relation with a bevelled gear 97ª, the latter of which provides a friction disc face 98 for cooperation with a friction disc 99 splined upon the engine drive shaft 20, and operated by means of a lever 100. By movement of the lever 100, the disc 99 may be moved into engagement with the friction face 98 of the bevelled gear 97ª, so as to rotate the latter for driving of the shafts 84 and 92, in order to rotate the various lifting propellers E. This is a friction clutch arrangement, and as above mentioned for the propeller E, it will be necessary to provide positive connection of the shaft 101, upon which the bevelled gear 97ª is mounted, and the engine drive shaft 20. This is preferably effected by providing a polygonal pin 102 for longitudinal sliding within the shaft 101 for cooperative engagement in a polygonal socket 103 in the engine drive shaft 20; said shaft 101 being operated by means of a pedal 105 having an arm 106 slidably engaging the same.

In operation, it is obvious that the lifting propellers E are adapted for rotation in substantially a horizontal plane, so that the aircraft A may be lifted substantially vertically of the ground surface to provide for an ascent of the same in a relatively small space. By means of the control levers 61 and the pedal 68, the blades 36 of the various lifting propellers E may be adjusted as to pitch angle, so that the leading edges of said blades 36 may extend out of the plane in which they are disposed in the sustaining wings 11 and 15. Revolving of the propeller, during such positioning of the blades will effect the lift of the aircraft. Due to the contour of the blades 36, and because of the fact that the edge strips 40ª somewhat retain the air stream against side slip, the aircraft may ascend practically vertically. The blades 36, may, of course, be adjusted on either side of the axis of oscillation thereof, so that it is not only possible to secure an upward pull for ascent of the aircraft, but said blades may be positioned so that revolving of the propellers will cause a downward push, so to speak, for descent of the aircraft. The aircraft having ascended, as desired, the propeller D may be connected to the engine drive shaft 20 during high speed rotation thereof, first through merely frictional engagement of the discs 70 and 71, and later through positive connection by means of the pin 75 operating in socket 78. Such a connection having been effected, the propeller D will, of course, drive the aircraft A for forward travel and the vertical lift propellers E may be disconnected, as by disengagement of the friction members 97ᵃ and 99, and the pin 102 from the socket 103. When thus forwardly travelling, the blades 36 of the lift propellers E are adjusted so as to lie substantially in a common plane, or in the plane of their supporting wings, conforming substantially to the camber of said wings and in this respect being concavo-convex in formation. Very little head resistance is offered by the propellers E, as they are thus compactly disposed within the sustaining planes, forming portions of the sustaining surfaces of said planes themselves.

As a safety factor, an electrical motor 110 may be provided, including a drive shaft 111, which has at its forward end, a gear 112 splined thereon and operated by means of a lever 113, said gear 112 preferably cooperating with the external teeth provided on the disc 70 above mentioned, so that the propeller D may be connected for drive by the motor 110. Similarly, it is preferred that a gear 115 be splined on the other end of the electric motor shaft 111 for operation, as by a lever 116, to coperate with certain novel teeth circumferentially provided on the bevelled gear 97ᵃ, so that the various propellers E may be connected for drive to the electrical motor 110. If preferred, gears 118 and 119 may be respectively provided on the engine drive shaft 20 and the electrical motor drive shaft 111, so that the internal combustion engine C may be readily started, it being preferred that the gear 119 be splined upon its shaft for operation as by a lever 120. The various levers 72, 77, 100, 113, 116, and 120 may be operated in any approved manner, as by means of a series of foot pedals 125 having links or rods 126 leading thereto.

The various drives for the propeller means embodied in this invention are, of course, susceptible of rearrangement, and the operating means of the same may be altered to provide the most effective and convenient operating arrangement for the driver of the aircraft A. The number of propellers E may vary in different sizes and types of air craft much depending upon the load to be lifted or controlled during descension, and the speed with which such is to be accomplished. The blades 36, as well as other parts of the propeller arrangement E, may be of any approved material, preferably light metal, as aluminum, and the blades may be provided in any number consistent with the type of aircraft in connection with which the propellers E are used. Various other changes may be made to the shape, size, arangement of parts, and substitution of equivalents, of the invention herein shown and described, without departing from the spirit of the invention or the scope of the claims.

I claim:

1. In an aircraft the combination of a sustaining plane having a substantially circular opening therein, a shaft extending axially through said opening upon both sides of the plane, means supporting said shaft fixedly in position, a plurality of blades radially pivoted to said shaft in the opening of said plane, and having lever arms extending upwardly from their inner ends, means pivoting the outer ends of said blades in a fixed relation relative to each other, a sleeve slidable upon said shaft above said plane, and links connecting said sleeve to the lever arm of said blades whereby they may be opened at a desired pitch or closed to form a part of the sustaining surface of said sustaining plane.

2. As an article of manufacture a propeller comprising a substantially ring-shaped frame, a shaft axially disposed in said frame, means supporting the shaft in such position that it extends outwardly of both sides of the plane of said frame, a plurality of blades, means radially pivoting the blades upon said shaft at their inner ends and to said circular frame at their outer ends within the opening of said circular frame, the blades being provided at their inner ends with arms extending longitudinally of the shaft and having transversely extending free end portions, a sleeve ridable upon the shaft and links pivotally connected with the sleeve and free ends of the arms for operating said blades to open them at a desired pitch or to close them to form a sustaining surface.

FRED PILGER.